United States Patent
Arstein et al.

(10) Patent No.: US 9,033,372 B2
(45) Date of Patent: May 19, 2015

(54) FITTING NUT WITH ADAPTED ENGAGING SURFACES

(71) Applicant: Swagelok Company, Solon, OH (US)

(72) Inventors: Dale C. Arstein, Highland Heights, OH (US); Carl E. Meece, Moreland Hills, OH (US); Peter C. Williams, Cleveland Heights, OH (US); Edward A. Pezak, Solon, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 13/658,147

(22) Filed: Oct. 23, 2012

(65) Prior Publication Data

US 2013/0140815 A1 Jun. 6, 2013

Related U.S. Application Data

(63) Continuation of application No. 13/217,551, filed on Aug. 25, 2011, now abandoned, which is a continuation of application No. 11/639,529, filed on Dec. 15, 2006, now Pat. No. 8,007,013.

(60) Provisional application No. 60/758,688, filed on Jan. 13, 2006, provisional application No. 60/834,548, filed on Jul. 31, 2006.

(51) Int. Cl.
   *F16L 19/10* (2006.01)
   *F16L 15/00* (2006.01)
   *F16L 19/06* (2006.01)
   *F16L 19/08* (2006.01)

(52) U.S. Cl.
   CPC ............... *F16L 15/00* (2013.01); *F16L 19/061* (2013.01); *F16L 19/08* (2013.01); *F16L 19/103* (2013.01); *F16L 19/10* (2013.01)

(58) Field of Classification Search
   USPC .............. 285/339, 341, 342, 343, 354, 382.7, 285/386, 389, 348
   See application file for complete search history.

(56) References Cited

U.S. PATENT DOCUMENTS 2,351,363 A   6/1944   Parker et al.
2,579,529 A   12/1951  Woodling (Continued)

FOREIGN PATENT DOCUMENTS

DE   19736765    2/1999
DE   10206684    8/2003

(Continued)

OTHER PUBLICATIONS

Communication from European Application No. 12164312.6 dated Jul. 26, 2013.

(Continued)

*Primary Examiner* — James Hewitt
(74) *Attorney, Agent, or Firm* — Calfee, Halter & Griswold LLP

(57) ABSTRACT

A fitting assembly is provided with a first fitting component having a stepped wall surface; and a second fitting component radially spaced from the first fitting component when the fitting assembly is in a finger tight condition prior to pull-up. When the second fitting component is displaced into contact with the stepped wall surface during fitting pull-up, the stepped wall surface assists in separating the first fitting component from the second fitting component upon fitting disassembly.

15 Claims, 12 Drawing Sheets

(56) References Cited

U.S. PATENT DOCUMENTS

| | | | |
|---|---|---|---|
| 2,695,796 A | | 11/1954 | Woodling |
| 3,075,793 A | * | 1/1963 | Lennon et al. ............... 285/342 |
| 3,103,373 A | * | 9/1963 | Lennon et al. ............... 285/342 |
| 3,321,947 A | | 5/1967 | Teeters |
| 3,402,949 A | | 9/1968 | Mahoney |
| 3,445,128 A | * | 5/1969 | Teeters .......................... 285/341 |
| 3,695,647 A | | 10/1972 | Pugliese |
| 4,063,760 A | | 12/1977 | Moreiras |
| 4,076,286 A | | 2/1978 | Spontelli |
| 4,304,422 A | * | 12/1981 | Schwarz ............................ 285/4 |
| 4,915,427 A | * | 4/1990 | Zahuranec ................... 285/342 |
| 5,074,599 A | | 12/1991 | Wirbel et al. |
| 6,279,242 B1 | | 8/2001 | Williams et al. |
| 7,014,215 B2 | | 3/2006 | Cooper et al. |
| 7,393,018 B2 | | 7/2008 | Williams |
| 7,407,196 B2 | | 8/2008 | Bennett et al. |
| 7,497,483 B2 | | 3/2009 | Williams et al. |
| 8,007,013 B2 | | 8/2011 | Arstein et al. |
| 2008/0012301 A1 | | 1/2008 | Arstein |

FOREIGN PATENT DOCUMENTS

| | | |
|---|---|---|
| JP | 51-030297 | 3/1976 |
| JP | S5130297 | 8/1976 |
| JP | 56-156586 | 12/1981 |
| JP | 5-149491 | 6/1993 |
| JP | 11-230477 | 8/1999 |
| JP | 2003-509645 | 3/2003 |
| JP | 2007-510871 | 4/2007 |
| JP | 2010-534804 | 11/2010 |
| WO | 01/20214 | 3/2001 |
| WO | 2009/003016 | 12/2008 |

OTHER PUBLICATIONS

Office action from U.S. Appl. No. 13/266,186 dated Sep. 12, 2013.

Office action from Japanese Application No. 2013-008942 dated Mar. 3, 2014.

\* cited by examiner

FITTING NUT WITH ADAPTED ENGAGING SURFACES

CROSS-REFERENCE TO RELATED APPLICATIONS

The present application is a continuation application of and claims priority to U.S. patent application Ser. No. 13/217,551, filed Aug. 25, 2011, entitled "Fitting for Tube and Pipe,", now abandoned, which is a continuation application of and claims priority to U.S. patent application Ser. No. 11/639,529, filed Dec. 15, 2006, entitled "Fitting for Tube or Pipe", now U.S. Pat. No. 8,007,013, which claims priority from U.S. provisional application Ser. No. 60/758,688, entitled "FITTING FOR TUBE OR PIPE," filed on Jan. 13, 2006, and from U.S. provisional application Ser. No. 60/834,548, entitled "FITTING FOR TUBE OR PIPE," filed on Jul. 31, 2006, the entire disclosures of which are fully incorporated herein by reference in their entireties.

BACKGROUND OF THE INVENTION

Fittings may be used to join or connect the end of a tube or other conduit to another member, whether that other member be another tube or conduit end such as through T-fittings and elbow fittings, for example, or a device that needs to be in fluid communication with the tube end, such as for example, a valve. One type of fitting uses a gripping arrangement including two ferrules that provide a gripping and sealing action between a tube and a body under the influence of a female threaded drive nut. Other types of fittings are also known, such as, for example, single ferrule fittings, fittings that use other types of tube gripping devices, and fittings that use male threaded drive nuts.

Tube fitting components that are radially displaced or expanded upon pull-up take up a portion of the deformation energy of pull-up and may contact radially adjacent and/or radially nearby fitting component surfaces as a result of the expansion or displacement. For example, the tubing inboard of the tube gripping member, such as, for example, the front ferrule of a two ferrule fitting or the ferrule of a single ferrule fitting, may expand radially outward during fitting pull-up and takes up a portion of the deformation energy of pull-up.

SUMMARY OF THE INVENTION

The application pertains generally to a fitting assembly that is configured to assist in separating two or more fitting components during disassembly of the fitting if and when the mating components contact each other during pull-up, for example, due to radially outward movement of a fitting component as a result of axial compression of the fitting component during fitting installation. As used herein, fitting components of a fitting assembly may include, but are not limited to, bodies, such as, for example, coupling bodies and valve bodies, drive nuts, tube gripping members, such as, for example, ferrules, tubing or other conduits, and fitting installation tools, such as, for example, tube gripping member installation tools or pre-swaging tools.

According to one inventive aspect, one or more fitting component engaging surfaces may be configured to reduce radial reaction forces between two contacting fitting components of a pulled-up fitting. For example, a surface of a first fitting component that is axially aligned with a second fitting component during fitting assembly may be radially recessed to provide reduced radial reaction forces between the recessed surface and the second component during disassembly. As used herein, two components are "axially aligned" if a portion of the first component is located at the same axial position (e.g., a position along a fitting) as a portion of the second fitting component. As another example of fitting components configured to reduce radial reaction forces resulting from contact between fitting components of a pulled-up fitting, a surface of a first fitting component that contacts a second fitting component during fitting assembly may be axially shortened to reduce a length of contact between the first and second components and, as a result, to provide reduced radial reaction forces between the first and the second components during disassembly.

Accordingly, in one exemplary embodiment, a fitting component includes a body having a tube socket that includes a recessed wall surface radially spaced from a tapered tube capture surface. Such a fitting component may be used in a fitting assembly that includes a tube having an end portion that engages the tube capture surface prior to fitting pull-up. When the fitting assembly is pulled-up, additional engagement between the tube socket and the tube end portion, for example, due to radially outward deflection or bowing of the tube end resulting from axial compression of the tube end, produces axial and radial reaction force components between the tube socket and tube end portion. By providing a recessed longitudinal surface in the tube socket, the radial force component between the first and second components may be reduced, thereby assisting in separation of the first and second components during disassembly of the fitting assembly.

According to another inventive aspect, one or more fitting component mating surfaces may additionally or alternatively be configured to produce an axial component of reaction force between two contacting fitting components of a pulled-up fitting. This axial component of elastic reaction force may assist in separating the two fitting components during disassembly of the pulled-up fitting. For example, a first fitting component may include a stepped wall surface, which may, for example, include a tapered surface, that contacts a second fitting component during fitting pull-up to produce an axial component of reaction force, which may assist in separation of the first and second fitting components when the fitting is disassembled.

Accordingly, in one exemplary embodiment, a fitting assembly has a first fitting component having a stepped wall surface and a second fitting component radially spaced from the tapered longitudinal surface when the fitting assembly is in a finger tight condition prior to pull-up. When the second fitting component is radially displaced into contact with the stepped wall surface during fitting pull-up, the stepped wall surface assists in separating the first fitting component from the second fitting component upon fitting disassembly. For example, engagement of the second fitting component with the stepped wall surface may produce an axial component of reaction force that assists in axially moving the second fitting component away from the first fitting component. As another example, the stepped wall surface may provide for a reduced radial reaction force between the first and second fitting components upon initial axial movement of the second fitting component during fitting disassembly.

In one such embodiment, a fitting body is provided with a tube socket having a stepped wall surface, such that when a tube that is assembled with the fitting body radially expands to contact the stepped wall surface, an axial component of reaction force resulting from this contact may assist in separating the tube from the fitting body upon disassembly of the fitting. Additionally, the stepped condition of the tube socket wall may reduce the radial force between the fitting body and the tube during withdrawal of the tube from the fitting.

In an exemplary embodiment, a component of a tube fitting for a tube end includes a body having a tube end socket centered on an axis, for receiving a tube end. The tube end socket has a shoulder defining an axially inner end of the socket, a tapered tube capture surface adjacent the shoulder for engaging the tube end, a camming mouth near an axially outer end of the tube end socket, for engaging a ferrule, and a stepped wall surface disposed between the tube capture surface and the camming mouth. When the tube expands to contact the stepped wall surface during fitting pull-up, this contact between the stepped wall surface and the tube produces an axial component of elastic reaction force against the tube, which can assist in tube removal from the socket upon fitting disassembly. Additionally, the stepped condition of wall surface may reduce the radial force between the tube socket and the tube end, for example, by providing radial separation between the tube and at least a portion of the tapered surface during withdrawal of the tube from the tube socket.

In another embodiment, a fitting body may be provided with a tapered tube capture surface that is extended to assist in separation of the tube from the fitting body upon disassembly of the fitting. For example, a tapered tube capture surface in a tube socket of a fitting body may extend to a calming mouth of the tube socket, thereby eliminating any intermediary or transitional wall surface between the tube capture surface and the camming mouth. In one such exemplary embodiment, a tube fitting for a tube end includes a fitting body having a tube end socket centered on an axis, for receiving a tube end. The tube socket includes a shoulder defining an axially inner end of the socket, a tapered tube capture surface outward of the shoulder for engaging the tube end, and a camming mouth outward of and directly adjacent to the tube capture surface, for receiving at least a portion of a ferrule.

In another embodiment, a drive nut is provided with an inner wall having a tapered longitudinal surface, such that when a tube gripping member that is assembled with the drive nut and a fitting body is displaced into contact with the tapered longitudinal surface, an axial component of elastic reaction force resulting from this contact may assist in separating the tube gripping member from the drive nut upon disassembly of the fitting. Additionally, the tapered condition of the longitudinal wall may reduce the radial force between the drive nut and the tube gripping member during separation of the tube gripping member from the drive nut, for example, by providing radial separation between the tube gripping member and at least a portion of the tapered surface during fitting disassembly.

In other embodiments, multiple fitting components may be configured to reduce radial reaction forces and/or increase axial reaction forces between contacting fitting component surfaces of a pulled-up fitting, thereby assisting in disassembly of the fitting. For example, a fitting assembly may include a fitting body with a tube socket having a tapered wall to assist in separating a tube end from the fitting body during fitting disassembly, and a drive nut with an inner wall having a tapered longitudinal surface to assist in separating a tube gripping member from the drive nut during fitting disassembly.

According to still another inventive aspect of the present application, a fitting component including a tube socket configured to receive a tube end may be provided with a counter-bowing feature that reduces radially outward expansion or deflection of the tube end, including, for example, bowing or barreling of a tube end resulting from axial compression of the tube end. The reduced bowing of the tube end may result in reduced radial reaction forces between the tube end and the socket, which may assist in separation of the first fitting component and the tube end during disassembly.

In one such embodiment, a fitting component includes a socket for receiving a tube end, the socket being defined by an axial longitudinal wall surface and a shoulder including a surface extending axially and radially inward from an axially inner end of the axial longitudinal wall surface. When a tube end is inserted in the socket and axially compressed against the shoulder, the shoulder surface is configured to apply counter-bowing forces to the tube end to reduce bowing of the tube end during axial compression.

Further advantages and benefits will become apparent to those skilled in the art after considering the following description and appended claims in conjunction with the accompanying drawings.

DETAILED DESCRIPTION OF EXEMPLARY EMBODIMENTS OF THE INVENTION

Figure 1:
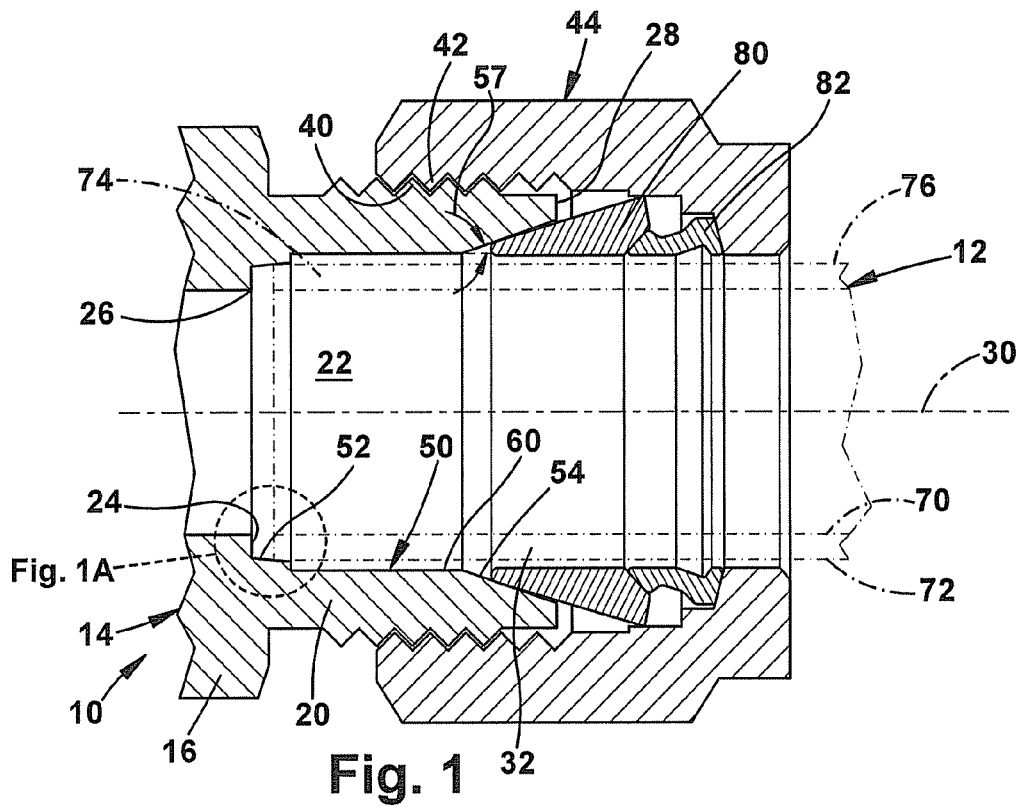
FIG. 1 is a partial sectional view of a tube fitting having a tube socket with a recessed intermediate wall surface, shown in a finger tight condition before pull-up of the fitting.

This disclosure relates to fitting components, for use with any type of fluid conduit, including tube or pipe. The exemplary embodiments are described herein with the terms "tube" and "tubing," but may be used with pipe and other conduits. The disclosure is applicable to fitting components of varying constructions, materials, sizes, and dimensions such as diameters, for example, all of which are described herein with the term "tube fitting." The tightening or preparation of a fitting connection is referred to herein as fitting "pull-up" or "make up," with both terms being used interchangeably. Fitting pull-up or make up is not limited to a specific pull-up position.

Tube fitting components that are radially displaced or expanded upon fitting pull-up may contact radially adjacent and/or radially spaced fitting component surfaces as a result of the expansion or displacement. Examples of this radially outward movement include bowing or barreling of a tube end resulting from axial compression of the tube end, or outward deflection of a tube gripping member, such as a ferrule or ferrules, during fitting pull-up. The present application contemplates providing a fitting that may be configured to assist in the separation of these contacting fitting components during disassembly of the fitting, for example, by reducing radial reaction forces (which tend to resist separation) between the components, or by increasing axial reaction forces (which tend to promote separation) between the components. According to one inventive aspect, this assistance in separating the components may be accomplished by providing a first fitting component with a recessed surface radially spaced from a surface that engages a displaced portion of a second component upon fitting pull-up. As the second component is separated from the first component during fitting disassembly, the displaced portion is axially aligned with the recessed surface, causing radial reaction forces between the first and second fitting components to be reduced, thus facilitating further separation of the first and second fitting components.

According to another inventive aspect, assistance in separating contacting first and second fitting components may be accomplished by providing the first fitting component with a tapered longitudinal surface for engagement with a displaced portion of the second fitting component. For example, a tube end socket may include a tapered longitudinal wall to assist in removal of a tube end. As another example, a drive nut may include a tapered longitudinal surface on an inner wall to assist in separation of the drive nut from a tube gripping device, such as, for example, a ferrule or ferrules. In yet another exemplary embodiment, both the tube end socket and the drive nut may include tapered longitudinal surfaces to assist in separation from the tube end and tube gripping device, respectively.

An exemplary type of fitting with which the invention can be used includes two ferrules that provide a gripping and sealing action between a tube and a body under the influence of a female threaded drive nut. While exemplary embodiments illustrated and described herein show various inventive aspects as used with this two ferrule type fitting, these inventive aspects are also applicable to other types of fittings, such as, for example, single ferrule fittings, fittings that use other types of tube gripping devices, and fittings that use male threaded drive nuts. Also, while exemplary embodiments include fittings for use with stainless steel tubing having diameters of ¼ inch, ⅜ inch and ½ inch, the inventive aspects of the present application may be provided with fittings for use with many sizes and types of tubing.

Figure 2:
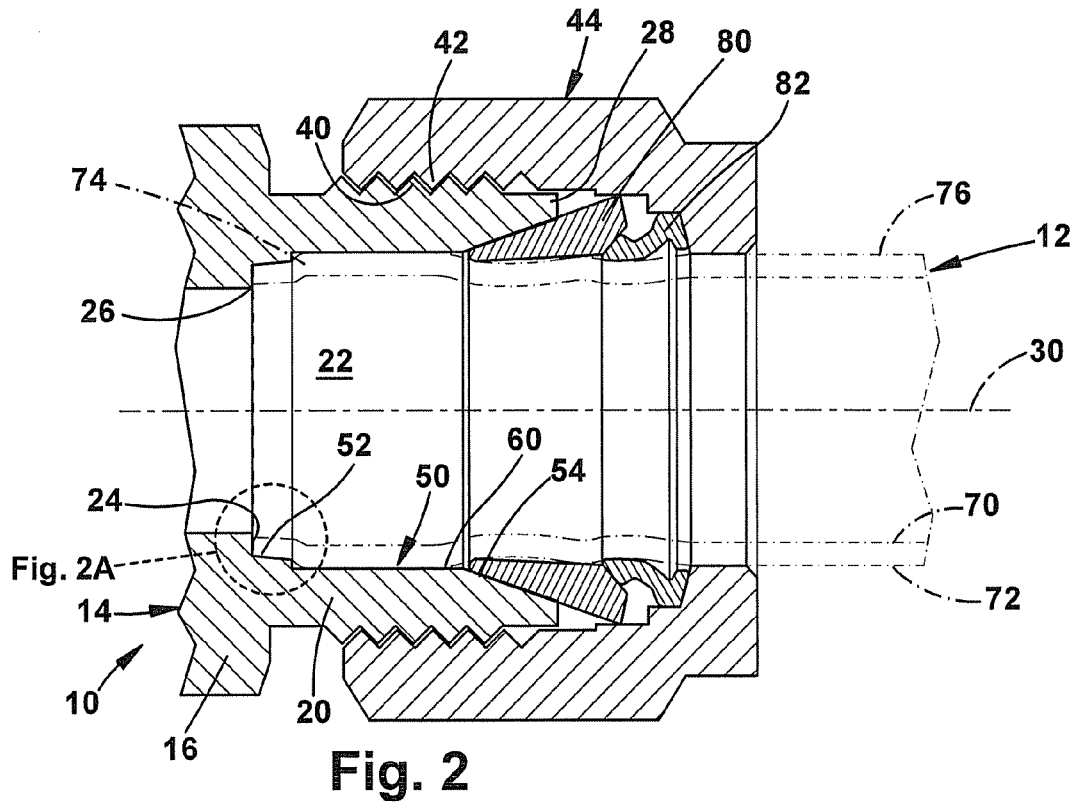
FIG. 2 is a partial sectional view of the tube fitting of FIG. 1 in a pulled-up condition.

FIGS. 1 and 2 illustrate a tube fitting 10 that is an exemplary embodiment of some of the inventive aspects described herein. The tube fitting 10 is used for connection with a tube 12 and includes a fitting body 14. The fitting body 14 is merely representative of the various different types of assemblies and fittings with which the invention is usable. For example, the fitting body can be a standalone device, or a portion of a valve, or a union, or any other type of fluid control device or fluid flow device.

The particular fitting body 14 that is illustrated has a main body portion 16 and a projecting socket wall 20. The socket wall 20 forms the radially outer periphery of a tube end socket 22 in the fitting body 14.

The fitting body 14 has a radially extending shoulder 24 that defines or is located at an axially inner end 26 of the socket 22. The socket wall 20 has an outer terminal end surface 28 extending generally radially with respect to an axis 30 of the fitting body 14. The terminal end surface 28 defines or is located at an axially outer end 32 of the socket 22.

A male thread 40 is formed on the exterior of the socket wall 20. The male thread 40 cooperates with a female thread 42 on a drive nut 44. The drive nut 44 is rotatable and movable axially relative to the fitting body 14.

The socket wall 20 has an inner wall surface 50 that partially defines the tube end socket 22. The inner wall surface 50 extends between the axially inner end 26 of the socket 22 and the axially outer end 32 of the socket. In the illustrated embodiment, the inner wall surface 50 extends between the shoulder 24 and the terminal end surface 28. The inner wall surface 50 may have various configurations in accordance with the inventive aspects described herein. Several embodiments are illustrated herein, and others will be readily apparent to those skilled in the art.

Figure 1A:
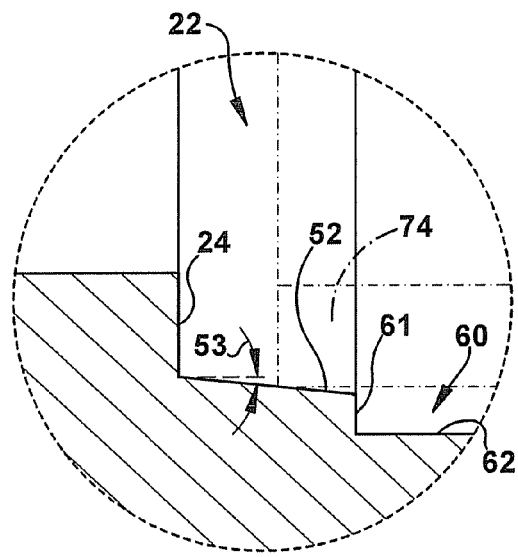
FIG. 1A is an enlarged sectional view of a portion of the tube socket of FIG. 1.

In the embodiment illustrated in FIGS. 1 and 2, the inner wall surface 50 of the tube end socket 22 includes a tube capture surface 52, a camming mouth portion 54, and a intermediate wall surface portion 60 (the details of which may be exaggerated in the drawings for clarity) between the tube capture surface 52 and the camming mouth portion 54. The exemplary tube capture surface 52 extends axially outward from the shoulder 24; however, in other embodiments, the tube capture surface 52 may be axially spaced from the shoulder 24. While the tube capture portion may take many different shapes, angles, contours, or geometries, the exemplary tube capture surface 52 of the inner wall surface 50 is a frustoconical tapered surface that tapers radially outward as it extends axially away from the shoulder 24. In the illustrated embodiment, as shown in FIG. 1A, the tube capture surface 52 has a taper angle 53. In an exemplary embodiment, the taper angle 53 is approximately four degrees (4°) relative to the axis 30. The taper angle 53 of the tube capture surface 52, and its overall diameter, may be selected to lightly hold or capture the end of the tube 12 prior to fitting pull-up, to inhibit the tube 12 from rotating in the socket 22 during pull-up of the fitting 10.

The exemplary camming mouth 54 is adapted to engage a ferrule (described below) that forms part of the tube fitting 10, and to cam the ferrule radially inward, thereby to provide, in a known manner, a gripping and sealing connection between the tube 12, the ferrule, and the fitting body 14. The angle 57 of the camming mouth 54, as referenced in FIG. 1, may be selected to provide the desired gripping and sealing connection. In an exemplary embodiment, the camming mouth angle 57 is approximately 20° relative to the axis 30.

The tube 12 that is illustrated is merely representative of the various different types and sizes of conduits with which the invention is usable. The particular tube 12 that is illustrated has a generally cylindrical configuration including parallel, cylindrical inner and outer side surfaces 70 and 72 centered on the axis 30. The tube 12 has an inner tube end 74 and an outer portion shown broken away at 76. When the tube fitting 10 is made up, the terminal end portion 74 of the tube 12 is located in the socket 22 of the fitting body 14, and the tube extends axially outward therefrom, and outwardly of the fitting body 14.

The particular tube fitting 10 that is shown in FIGS. 1 and 2 includes, in addition to the fitting body 13, a front ferrule 80, a rear ferrule 82, and a drive nut 44. The invention is applicable also to fittings including other types of tube gripping devices, including, for example, tube fittings that include only one ferrule rather than two ferrules. The invention is applicable also to tube fittings that include front and/or rear ferrules, and drive nuts, of differing constructions, many of which designs are known in the art.

FIG. 1 illustrates the fitting 10 in a finger-tight condition prior to pull-up. The tube 12 is inserted into the socket 22. The terminal end portion of the tube 74 extends into contact with the tube capture surface 52 of the inner wall surface 50 of the fitting body 14.

The outer surface 72 of the tube 12 is smaller in diameter than the intermediate wall surface 60 of the fitting body 14, and is thus spaced radially inward from the intermediate wall surface 60. The ferrules 80 and 82 are on the tube 12, and the drive nut 44 is threadedly engaged with the fitting body 14.

FIG. 2 illustrates the fitting 10 after pull-up. The drive nut 44 is screwed farther onto the fitting body 14. The movement of the drive nut 44 causes the ferrules 80 and 82 to provide a gripping and sealing engagement between the tube 12 and the fitting body 14.

Axially and radially inward movement of the nose of the front ferrule 80 causes the tube 12 to be pushed axially inward into engagement with the shoulder 24. Axial force on the tube 12 causes the portion of the tube end 74 that is located axially inward of the front ferrule 80 to barrel radially outward. This tube portion 74 might contact the intermediate wall surface portion 60 of the fitting body 14, for example, as shown in FIG. 2, producing a radial component of reaction force, which may also be referred to as an interference load or a friction load.

The intermediate wall surface portion 60 of the exemplary inner wall surface 50 extends between the tube capture surface 52 and the camming mouth portion 54. The surface 60 is centered on the axis 30. The exemplary intermediate wall surface 60 includes a stepped portion 61 (see FIG. 1A) axially outward of the tube capture surface 52 and a recessed portion 62 axially outward of the stepped portion 61, such that the recessed portion 62 is radially spaced from the tube capture surface 52. Thus, the diameter of the socket 22 is greater at the recessed portion 62 than at any point along the tube capture surface 52. Further, the average diameter of the inner wall surface 50 of the socket 22 is increased, as compared to a fitting tube socket without such a recess. Also, while the illustrated stepped portion 61 is directly adjacent to the tube capture surface 52, in other embodiments, the stepped portion 61 may be axially spaced from the outer edge of the tube capture surface 52.

Figure 2A:
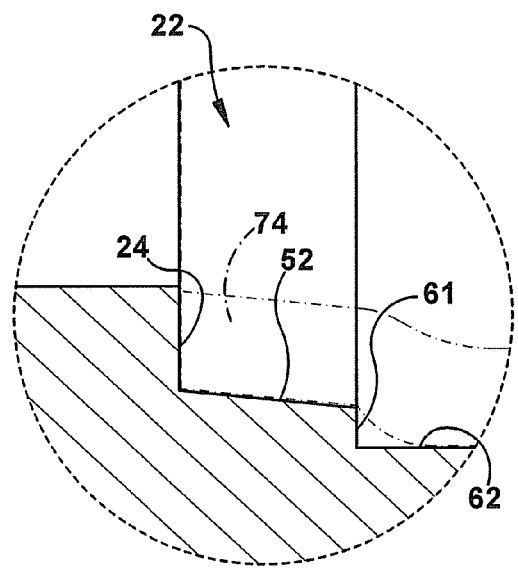
FIG. 2A is an enlarged sectional view of a portion of the tube socket of FIG. 2.
Figure 2B:
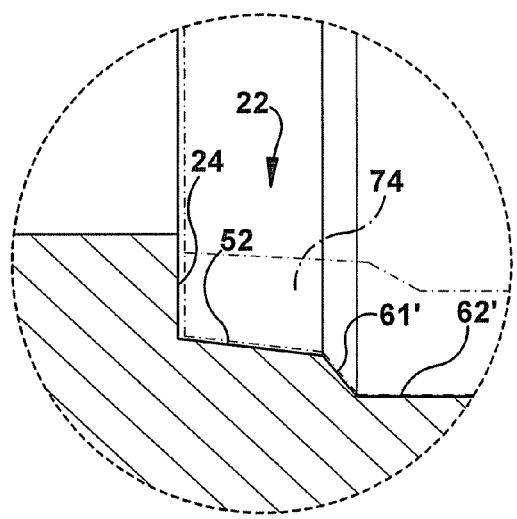
FIG. 2B is an enlarged sectional view of a portion of the tube socket of FIG. 1B, shown in a pulled-up condition.

In the illustrated embodiment of FIGS. 1, 1A, 2, and 2A, the exemplary stepped portion 61 is substantially perpendicular to the exemplary recessed portion 62, which is substantially cylindrical. As a result, when the tube end 74 expands during fitting pull-up and contacts the recessed portion 62, as shown in FIG. 2B, reaction forces between the cylindrical recessed portion 62 and the tube end 74 are substantially radial (i.e., non-axial). Also, contact between the expanded tube end 74 and the exemplary stepped portion 61 is minimal, resulting in little or no axial reaction forces from such contact. During disassembly of the exemplary fitting 10, engagement between the tapered tube capture surface 52 and the tube end 74 will provide axial reaction forces to assist in separating the tube end from the fitting body. During separation, as the end of the tube 74, which has experienced less expansion or displacement, axially moves into the recessed portion 62 of the tube socket, the radial reaction forces between the recessed portion 62 and the tube 12 are reduced or eliminated, thus assisting in separating the tube end 74 from the fitting body 14. Further, by increasing the average diameter of the inner wall surface 50 of the tube socket 22, total radial reaction forces along a length of contact between the tube 12 and the tube socket 22 are reduced.

Figure 1B:
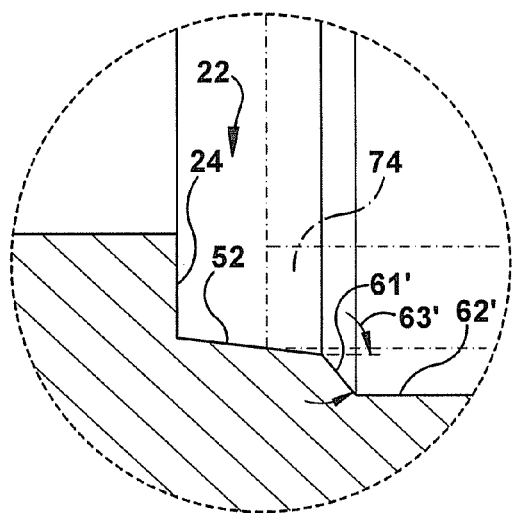
FIG. 1B is an enlarged sectional view of a portion of an alternative tube socket for the tube fitting of FIG. 1, also shown in a finger tight condition before pull-up of the fitting.

In another embodiment, as shown in the partial views of FIGS. 1B and 2B, the stepped portion 61' may be tapered, allowing for the potential for increased contact between the tube and the stepped portion 61' upon fitting pull-up, as shown in FIG. 2B. The potential contact between the tube 12 and the tapered stepped portion 61' provides an axial component of reaction force between the tube and the stepped portion 61' during fitting disassembly, which may assist in separation of the tube 12 from the fitting body 14. While the stepped portion 61' may be provided at many different angles and with many different surface contours, an exemplary embodiment includes a frustoconical stepped portion 61' at a taper angle 63' of approximately 20° relative to the axis 30.

In other embodiments, the stepped portion 61' may be steeper, with a larger taper angle 63', resulting in an axially shorter stepped portion 61' and a longer recessed portion 62', or the stepped portion 61' may be shallower, with a smaller taper angle 63', resulting in an axially longer stepped portion 61' and a shorter recessed portion 62'. Finite element analysis and testing of a particular fitting can determine how much taper is needed, in order to achieve a system that can provide an axial elastic reaction force on the tube, to assist in tube removal, upon disassembly.

In various exemplary embodiments, a stepped or tapered intermediate wall portion of a fitting body tube socket may be discontinuous with tube capture and camming mouth portions of the tube socket; that is, the stepped or tapered intermediate wall may be provided at a different angle than the tube capture and camming mouth portions 152, 154, may be radially spaced from the tube capture and camming mouth portions 152, 154, and/or may be axially spaced from the tube capture and camming mouth portions 152, 154.

Figure 3:
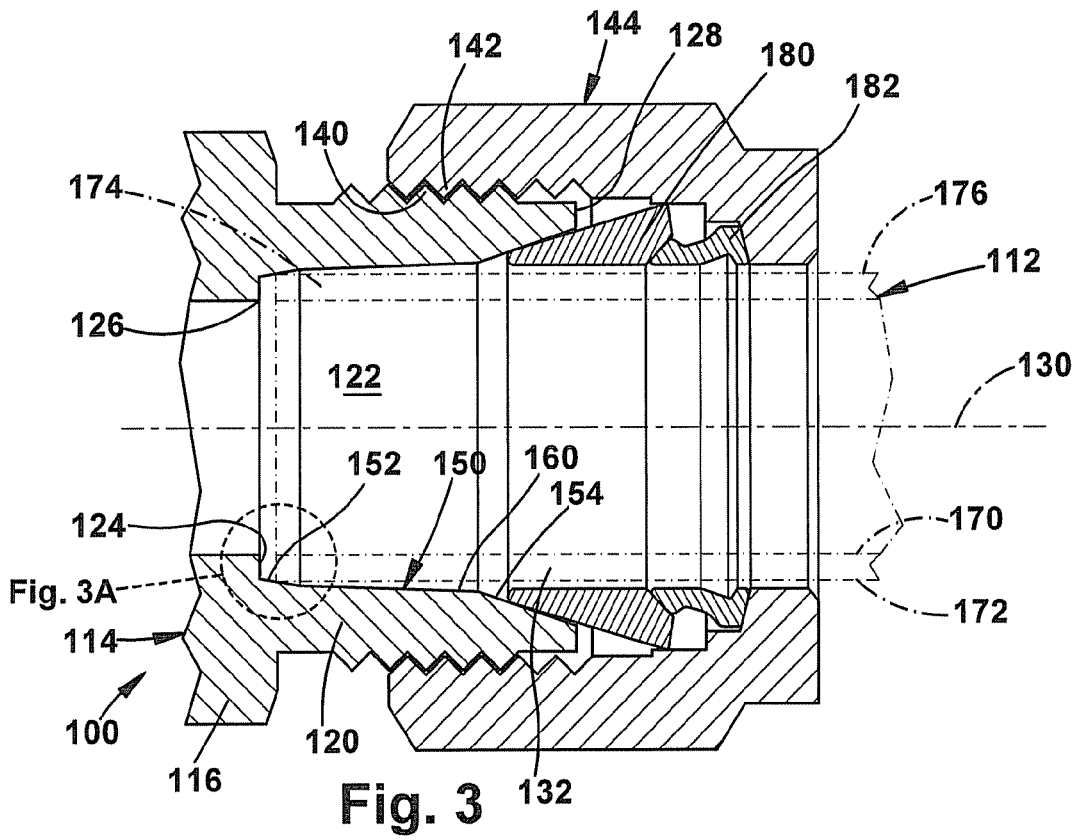
FIG. 3 is a partial sectional view of a tube fitting having a tube socket with a tapered intermediate wall surface, shown in a finger tight condition before pull-up of the fitting.
Figure 3A:
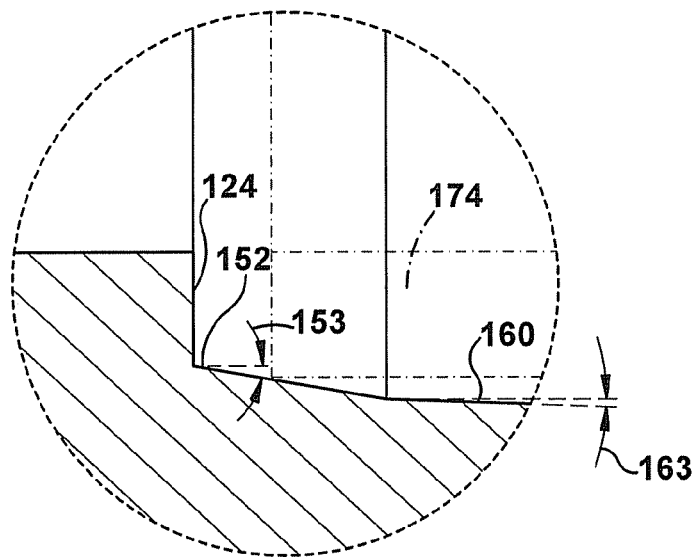
FIG. 3A is an enlarged sectional view of a portion of the tube socket of FIG. 3.
Figure 4:
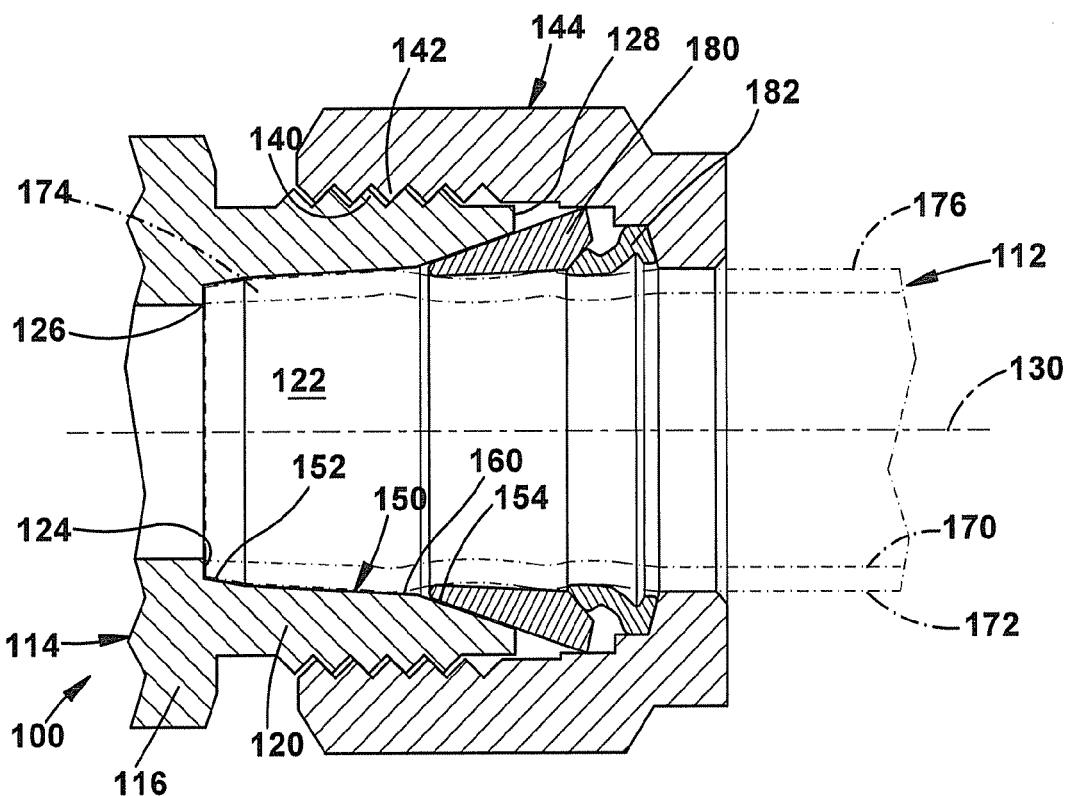
FIG. 4 is a partial sectional view of the tube fitting of FIG. 3 in a pulled-up condition.

In one embodiment, as shown in FIGS. 3 and 4, a fitting body 100 may be provided with a tube socket including a stepped portion 160 having a tapered longitudinal surface that extends to an inner edge of a camming mouth portion 154, thereby excluding a separate recessed portion of the tube socket 122. Engagement or contact between the stepped portion or tapered inner wall 160 and the expanded tube end 174 after fitting pull-up, when such contact occurs, produces an axial component of reaction force along the length of contact between the tube 112 and the tapered wall 160, thus assisting in separating the tube end from the fitting body 114. Also, while the illustrated stepped or tapered wall portion 160 is directly adjacent to the tube capture portion 152, the stepped portion may also be axially spaced from the outer edge of the tube capture portion 152.

The tapered condition of the wall surface 160 (as opposed to a cylindrical surface) can assist in removal of the tube 112 from the socket 122 upon disassembly. Once the tube end 174 is initially broken free from the tapered wall surface 160, the tube 112 can be removed without any substantial force, due to the reduction or elimination of radial reaction forces between the tube end 174 and the wall surface 160.

The tapered wall surface may be provided at a variety of taper angles and with a variety of surface contours. In one embodiment, a tapered wall surface is frustoconical and tapered to connect an outer edge of a tube capture portion with an inner edge of the camming mouth. In the illustrated embodiment of FIGS. 3 and 4, the tapered wall surface 160 is frustoconical with a taper angle 163. In one exemplary embodiment, the taper angle 163 is approximately 50 minutes, or five-sixths of a degree, relative to the axis 130. In such an embodiment, the taper angle 163 of the exemplary tapered wall surface 160 is significantly less than the taper angle 153 of the tube capture portion 152. As described below, the taper angle 163 of the tapered wall surface 160 is selected to assist in removal of a tube end if the tube end is expanded radially outward into contact with the socket wall during fitting pull-up. One desirable range of taper angles is from 50 minutes to one degree and fifty minutes, with a tolerance of plus or minus 15 minutes.

Figure 5:
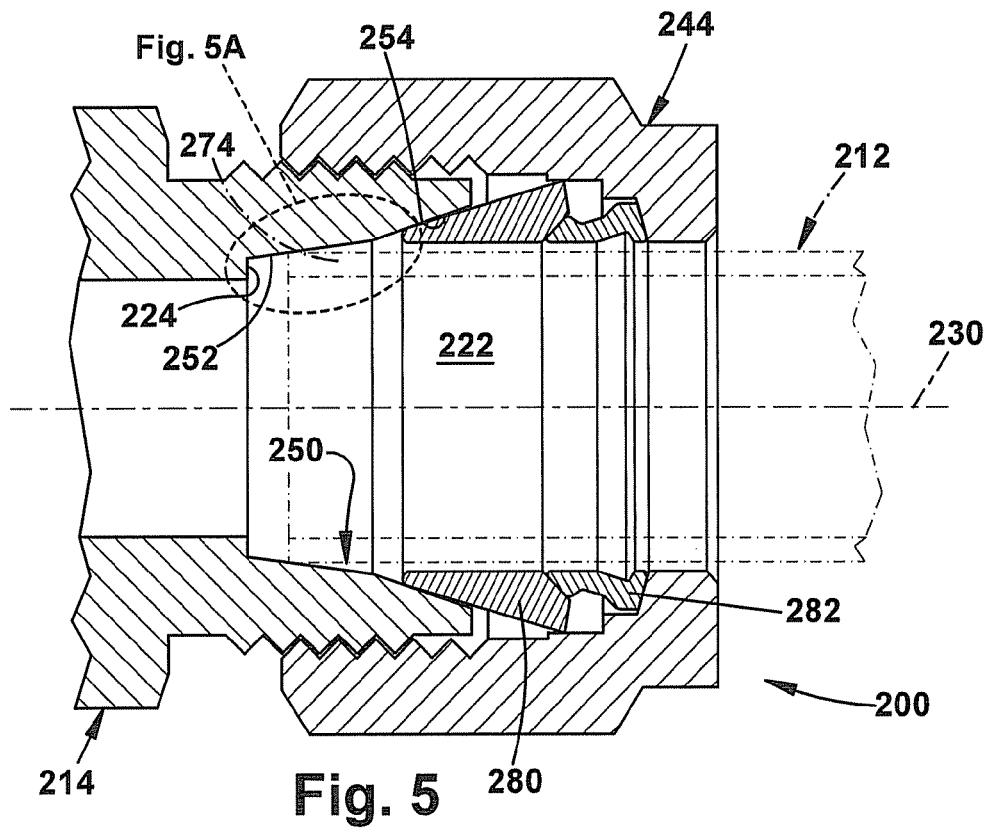
FIG. 5 is a partial sectional view of a tube fitting having a tube socket with no intermediate wall surface, shown in a finger tight condition before pull-up of the fitting.
Figure 5A:
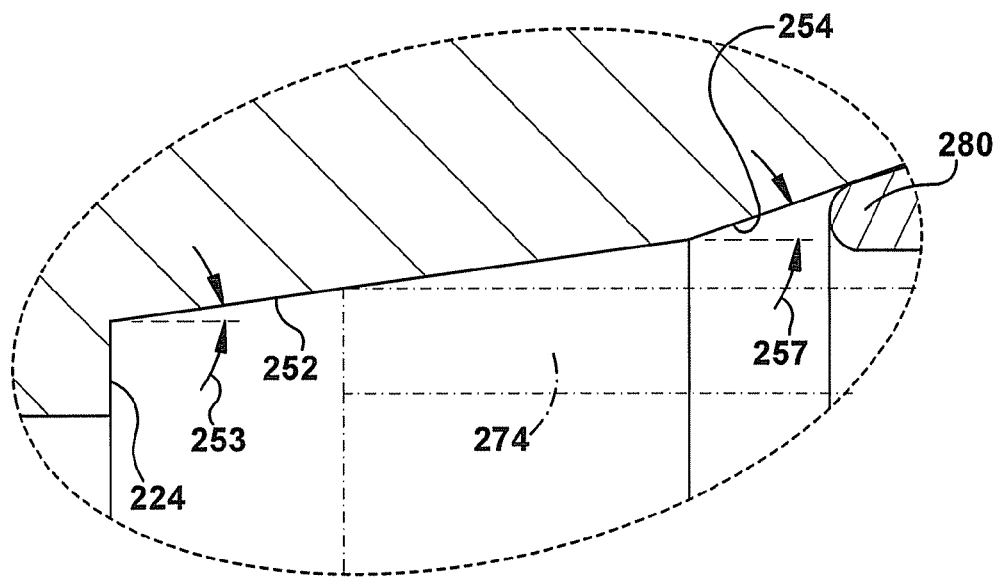
FIG. 5A is an enlarged sectional view of a portion of the tube socket of FIG. 5.
Figure 6:
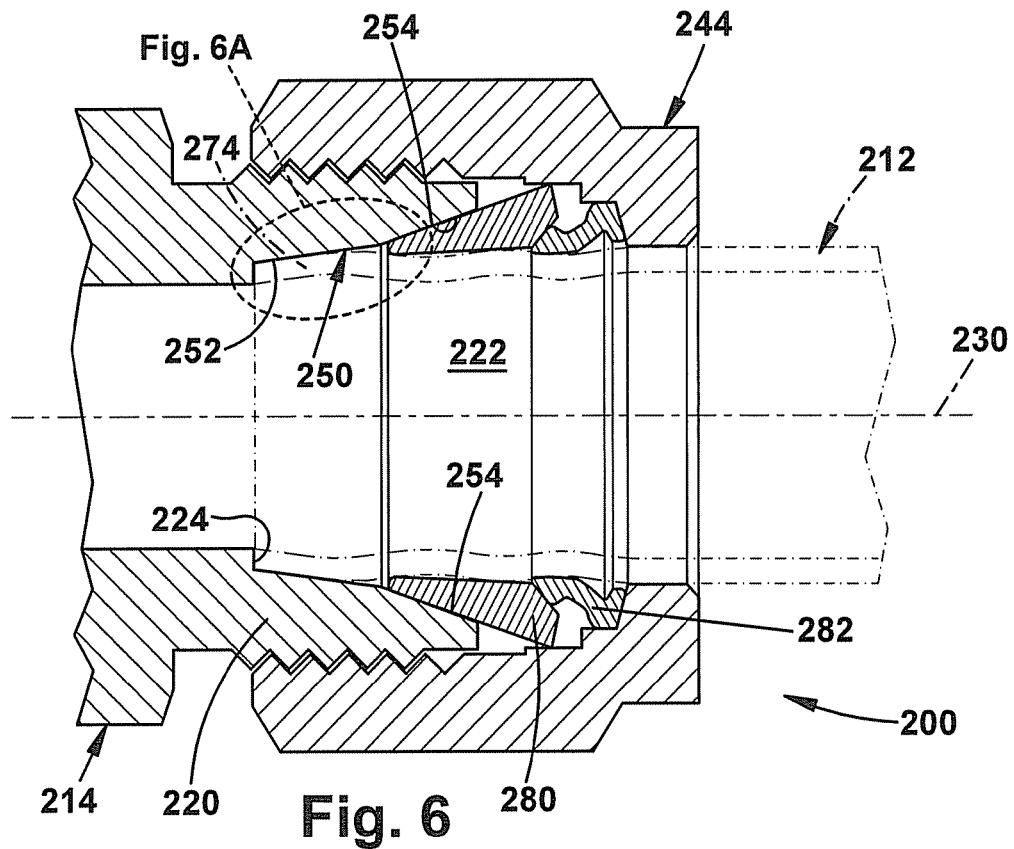
FIG. 6 is a partial sectional view of the tube fitting of FIG. 5 in a pulled-up condition.
Figure 6A:
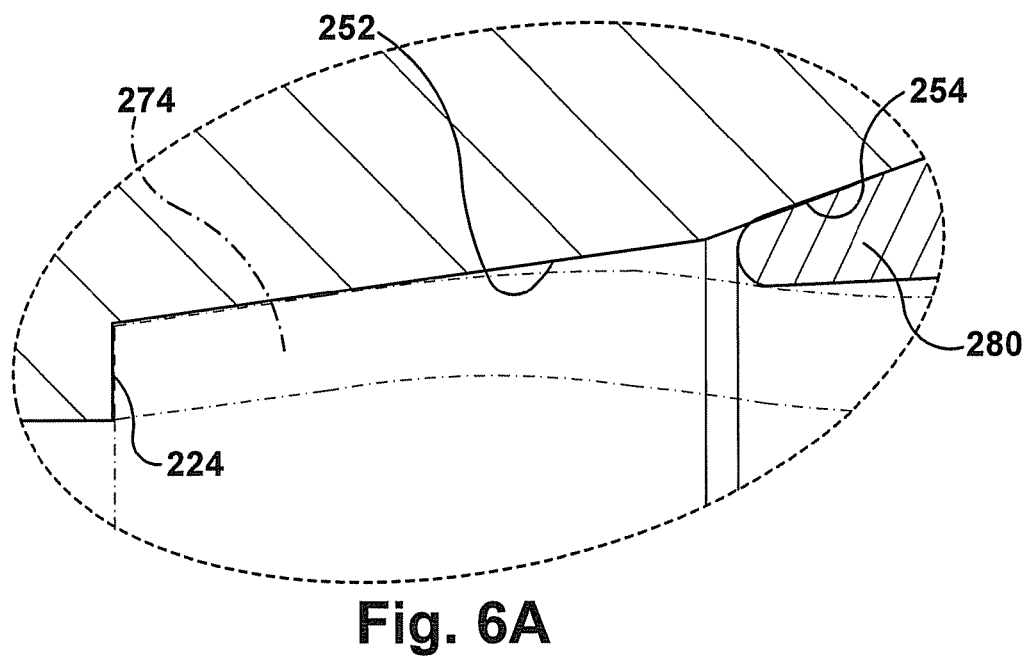
FIG. 6A is an enlarged sectional view of a portion of the tube socket of FIG. 6.

According to another inventive aspect of the present application, separation of a tube end from a fitting body may additionally or alternatively be facilitated by reducing the length of the portion of tube contacting the tube socket upon fitting pull-up. This may reduce the total radial reaction forces between these contacting surfaces, thereby assisting the separation of the tube end from the fitting body upon disassembly. In one embodiment, the length of contact between the expanded tube end and the tube end socket may be reduced by providing a recessed or tapered longitudinal surface in the tube end socket, as described with regard to the embodiments of FIGS. 1-4 above. In another embodiment, the length of contact between the expanded tube end and the tube end socket may additionally or alternatively be reduced by reducing the length of the tube socket. FIGS. 5 and 6 illustrate a fitting 200 that is one such exemplary embodiment. In the fitting 200, the fitting body 214 has a shallow or shortened socket 222. The outer periphery of the socket 222 is defined by an inner wall surface 250 of the fitting body 214. The inner wall surface 250 includes a tube capture portion 252 and a camming mouth 254, the angles of which may be exaggerated in the drawings for clarity.

The exemplary inner wall surface 250 of FIGS. 5 and 6 does not include an intermediate wall surface like the intermediate wall surfaces 60, 160 of the embodiments of FIGS. 1-4. Rather, the tube capture portion 252 abuts the camming mouth 254. That is, the camming mouth 254 is directly adjacent the tube capture surface 252 so as to provide a zero intermediate or transition length tube socket 222. Thus, there is neither a tapered wall surface, a stepped wall surface, nor a cylindrical wall surface between the tube capture portion 252 and the camming mouth 254 of the exemplary fitting body 214. While the taper angles 253, 257 of the tube capture portion 252 and camming mouth 254 may be any number of different angles, as determined through testing and finite element analysis, in an exemplary embodiment, the tube capture portion 252 has a taper angle 253 of approximately 4°, and the camming mouth has a taper angle of approximately 20°.

In other embodiments, the tube socket length may be selected to provide desired radial forces between the tube socket and the tube end, both upon fitting pull-up and after disassembly of the fitting. The shallow tube socket may alternatively be provided with a cylindrical intermediate tube wall or a stepped intermediate tube wall between a tube capture surface and a camming mouth. An appropriate socket length and/or intermediate tube wall geometry could be determined by finite element analysis and testing.

In accordance with other inventive aspects, one or more tapered longitudinal surfaces may be provided on one or more other fitting assembly components. In one embodiment, a tapered longitudinal surface may be provided on an inner wall of a drive nut of a fitting assembly to engage a portion of a tube gripping device assembled with the fitting when a portion of the tube gripping device is displaced outward and into contact with the inner wall of the nut during pull-up. This contact between the tapered longitudinal surface and the tube gripping device produces an axial component of an elastic reaction force against the tube gripping device, which can assist in separation of the nut from the tube gripping device upon fitting disassembly. FIGS. 7-12 illustrate exemplary embodiments of fittings including drive nuts having one or more of such tapered longitudinal surfaces.

Figure 7:
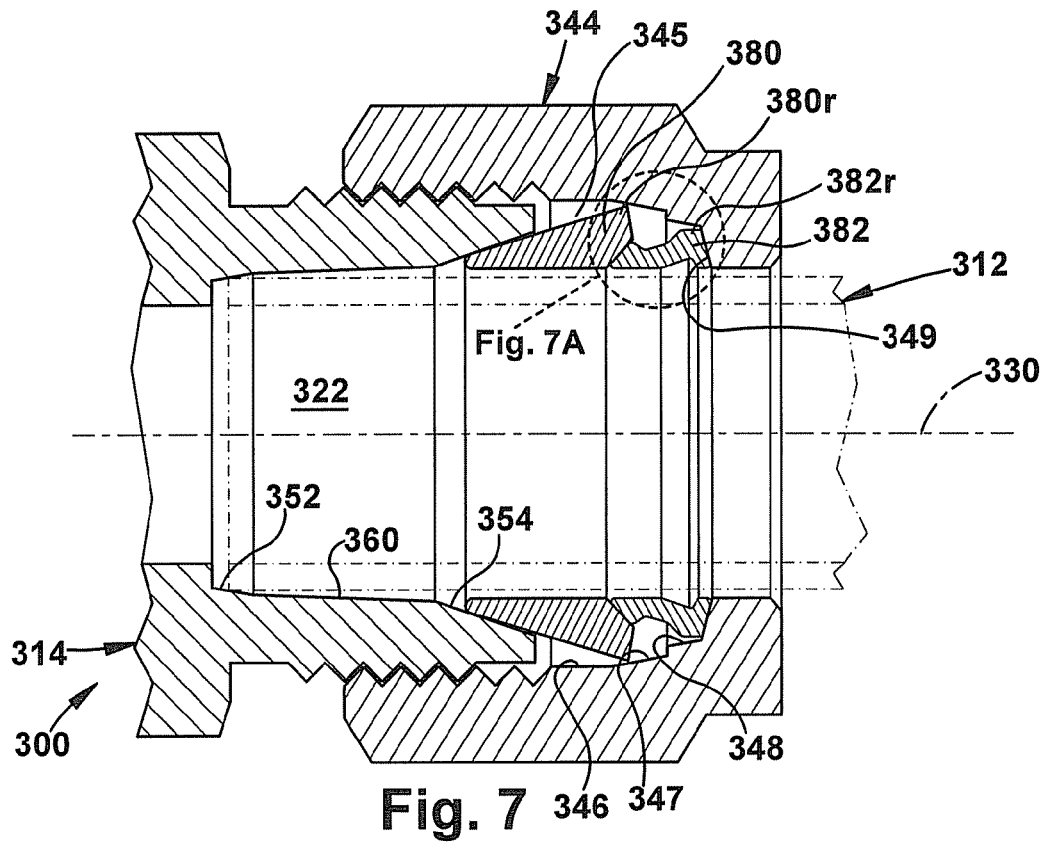
FIG. 7 is a partial sectional view of a tube fitting having a drive nut with a tapered inner wall surface, shown in a finger tight condition before pull-up of the fitting.
Figure 8:
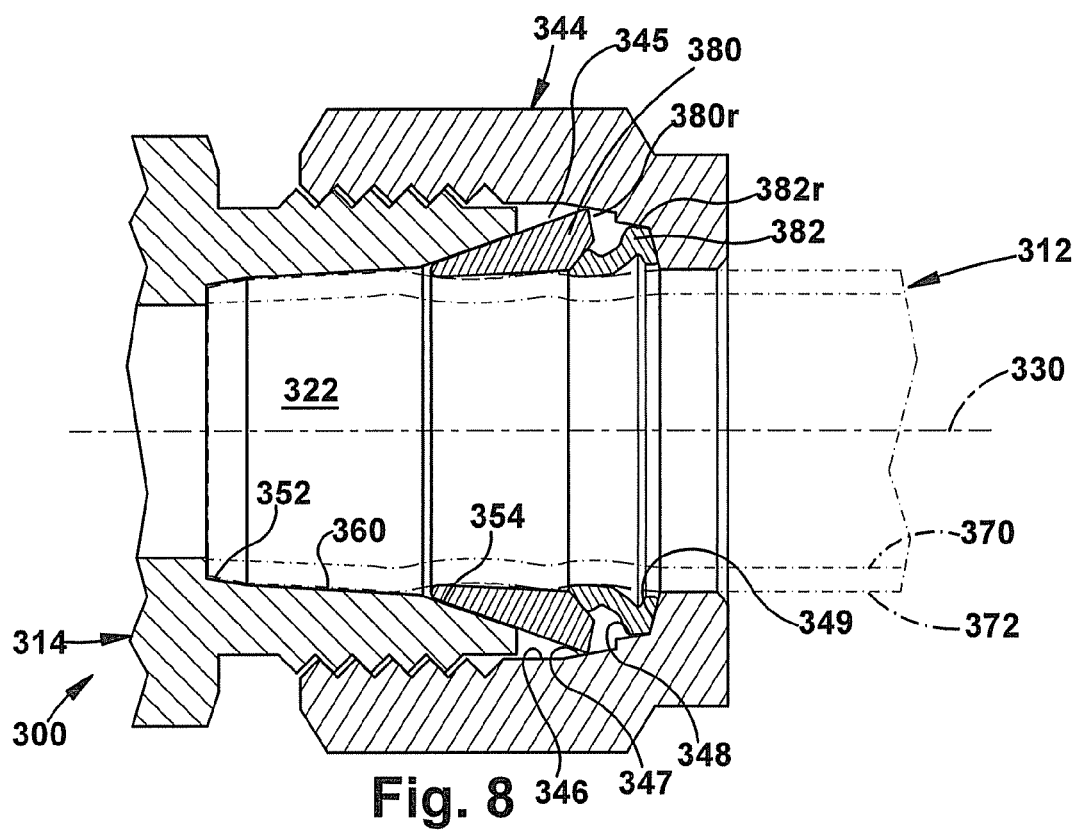
FIG. 8 is a partial sectional view of the tube fitting of FIG. 7 in a pulled-up condition.

According to one embodiment, FIGS. 7 and 8 illustrate a two-ferrule tube fitting 300. The tube fitting 300 may be used for connection with a tube 312 and includes a fitting body 314. The fitting body 314 is merely representative of the various different types of assemblies and fittings with which the invention is usable. For example, the fitting body can be a standalone device, or a portion of a valve, or a union, or any other type of fluid control device or fluid flow device. Further, the fitting body 314 may, but need not, be provided with recessed or tapered longitudinal surfaces, such as, for example, the tapered tube capture and tube end socket wall surfaces described above and illustrated in FIGS. 1-6. The particular tube fitting 300 that is shown in FIGS. 7-8 includes, in addition to the fitting body 314, a front ferrule 380, a rear ferrule 382, and a drive nut 344.

Figure 7A:
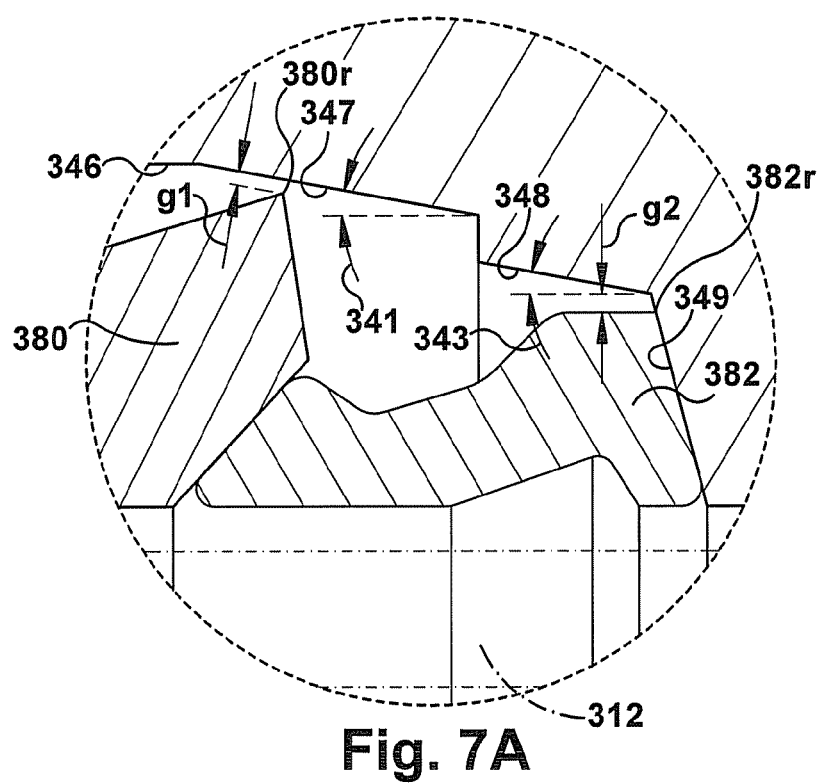
FIG. 7A is an enlarged sectional view of a portion of the drive nut and ferrules of the fitting of FIG. 7.

FIGS. 7 and 7A illustrate the fitting 300 in a finger tight condition prior to pull-up. The tube 312 is inserted through the nut 344 and into the socket 322. The front ferrule 180 is disposed in a first portion of a recess 345 in the nut 344, and the rear ferrule 382 is disposed in a second portion of the recess 345. Included in the recess is a frustoconical drive surface 349 for driving the ferrules 380, 382 into engagement with the tubing 312 during pull-up.

FIG. 8 illustrates the fitting 300 after pull-up. The drive nut 344 is screwed further onto the fitting body 314. The movement of the drive nut 344 causes the ferrules 380 and 382 to provide a gripping and sealing engagement between the tube 312 and the fitting body 314.

Axially and radially inward movement of a nose of the front ferrule 380 may cause an outer portion 380r of the front ferrule 380 to expand or deflect outward. Likewise, axially and radially inward movement of an inner, gripping portion of the rear ferrule 382 may cause an outer portion 382r of the rear ferrule 382 to expand or deflect outward. Under some circumstances, one or both of these outer portions of the ferrules 380, 382 may contact an inner wall 346 of the drive nut 344 during pull-up. In the exemplary embodiment of FIGS. 7 and 8, tapered longitudinal surfaces 347, 348 are provided on the inner wall 346 at locations axially aligned with the front and rear ferrules 380, 382. It should be noted that in other exemplary embodiments, tapered longitudinal surfaces may be provided axially aligned with only one of the two ferrules, or one continuous tapered longitudinal surface on the inner wall may extend to be axially aligned with both ferrules (not shown). In the illustrated embodiment of FIGS. 7 and 8, when the outer portions 380r, 382r of the front and rear ferrules 380, 382 deflect during pull-up, as shown in FIG. 8, one or both of the outer portions 380r, 382r may contact a corresponding one or both of the tapered longitudinal surfaces 347, 348, resulting in both a radial and an axial component of reaction force.

The tapered condition of these inner wall surfaces 347, 348 can assist in separation of the nut 344 from one or both ferrules 380, 382 upon disassembly. The axial component of reaction force produced by contact between the tapered surfaces 347, 348 and the ferrule or ferrules 380, 382 can assist in separation of the nut 344 from either or both of the ferrules 380, 382. Once the ferrule or ferrules 380, 382 are initially broken free from the tapered wall surfaces 347, 348, the nut 344 may be separated without any substantial force, due to the resulting radial separation or reduction in radial reaction force between the ferrule or ferrules 380, 382 and the tapered wall surfaces 347, 348.

To provide both sufficient radial containment of the ferrules and a sufficient axial reaction force between contacting nut and ferrule surfaces during disassembly, the taper angles 341, 343 of the inner wall surfaces 347, 348 of the drive nut 344, as measured from the axis 330 of the drive nut, may, for example, each range from greater than 0° up to approximately 45°. These two angles 341, 343 may, but need not, be the same. In an exemplary embodiment, the taper angles 341, 343 may each range from about 5° up to about 30°, and in a more preferred, but not required embodiment, the tapered angles 341, 343 may each range from about 10° to about 20°. In the illustrated embodiment of FIGS. 7 and 8, the tapered wall surfaces 347, 348 each have a taper angle 341, 343 of about 10° relative to the axis 330.

As described above, the taper angle of the tapered wall surface in a drive nut may be selected to assist in separation of the drive nut from the tube gripping device, such as, for example, a ferrule or ferrules, if any portion of the tube gripping device is expanded or deflected radially outward into engagement with the inner wall of the drive nut during pull-up. Additionally, a gap between the outer portion or portions of the tube gripping device and the tapered longitudinal surface or surfaces of the drive nut in the fitting's pre-tightened, finger tight condition may be selected independently or in combination with the taper angle to provide a desired radial reaction load between the outer portions of the ferrule or ferrules and the inner wall of the drive nut, to assist in tightening the tube gripping device to the tube end. In an exemplary embodiment, as shown in FIGS. 7 and 7A, a gap g1 is provided between the front ferrule outer portion 380r and the tapered longitudinal surface 347, and a gap g2 is provided between the rear ferrule outer portion 382r and the tapered longitudinal surface 348. The dimensions of these gaps and the taper angles of the tapered longitudinal surfaces may be varied to produce desired radial reaction forces during fitting pull-up, such as, for example, to produce radial reaction forces consistent with those experienced during pull-up of the fitting 300 with a nut having cylindrical inner wall surfaces, such as the drive nuts 44, 144, 244 shown in FIGS. 1-6. As such, a drive nut 344 with tapered longitudinal surfaces may be interchangeable with a nut having cylindrical inner wall surfaces, thereby allowing use of the same fitting body and tube gripping device. In one such exemplary embodiment, a tube fitting 300 for ½ inch tubing includes a gap g1 of approximately 0.010 inches between the front ferrule 380 and the tapered longitudinal surface 347, and a gap g2 of approximately 0.009 inches between the rear ferrule 382 and the tapered longitudinal surface 348.

According to another inventive aspect, tapered longitudinal surfaces may be provided on multiple components of a fitting to assist in the separation of multiple sets of contacting fitting components during fitting assembly. In one embodiment, tapered longitudinal surfaces are provided both on an inner wall of a body tube socket and on an inner wall of a drive nut, for separation from the tube end and tube gripping device, respectively, during fitting disassembly. In the illustrated exemplary embodiment of FIGS. 7 and 8, in addition to the tapered longitudinal surfaces 347, 348 on the nut 344, as described above, a tapered intermediate socket wall surface 360 is provided between a tube capture portion 352 and a caroming mouth 354, consistent with the tapered wall surface 160 of FIGS. 3 and 4, for assisting in separation of the fitting body 314 from the tube 312 during disassembly of the pulled-up fitting 300.

Figure 9:
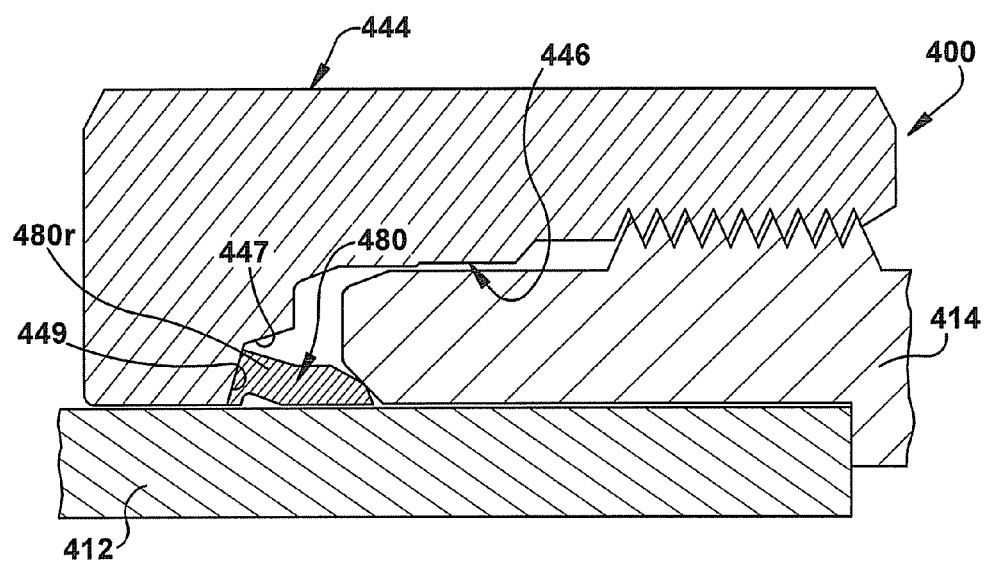
FIG. 9 is a partial sectional view of a single ferrule type tube fitting having a drive nut with a tapered inner wall surface, shown in a finger tight condition before pull-up of the fitting.
Figure 10:
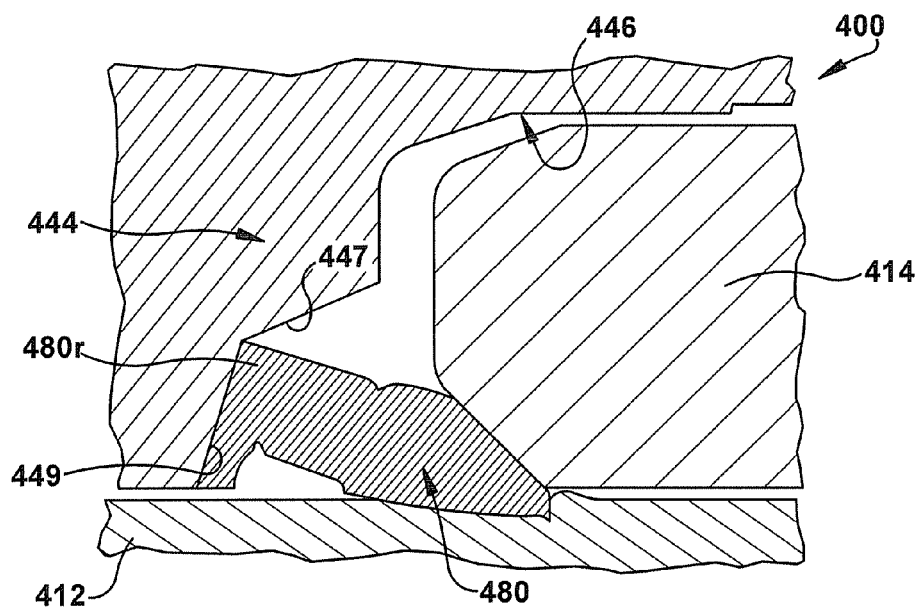
FIG. 10 is an enlarged partial sectional view of the tube fitting of FIG. 9 in a pulled-up condition.

FIGS. 9 and 10 illustrate a fitting 400 that is another exemplary embodiment in which a tapered longitudinal surface 447 is provided on an inner wall of a drive nut 444. The exemplary fitting of FIGS. 9 and 10 is a single ferrule design, similar to a single ferrule tube fitting described in co-pending application Ser. No. 10/467,241, published under Pub. No. US 2006/0049632 and entitled Tube Fitting for Stainless Steel Tubing, now U.S. Pat. No. 7,393,018, the entire disclosure of which is fully incorporated herein by reference.

During pull-up of the illustrated tube fitting, axially and radially inward movement of a nose of the single ferrule 480 may cause an outer portion 480r of the front ferrule 480 to expand or deflect outward. Under some circumstances, this outer portion 480r of the ferrule 480 may contact an inner wall 446 of the drive nut 444 during pull-up, causing a radial reaction load between the outer portion 480r of the ferrule 480 and the inner wall 446 of the drive nut 244. In the exemplary embodiment of FIGS. 9 and 10, a tapered longitudinal surfaces 447 is provided on the inner wall 446 at a location axially aligned with and radially spaced from the ferrule 480. When the outer portion 480r of the ferrule 480 deflects during pull-up, as shown in FIG. 8, the outer portion 480r may contact the tapered longitudinal surface 447, resulting in both a radial and an axial component of reaction force. The tapered condition of the inner wall surface (as opposed to, for example, a cylindrical surface) can assist in separation of the nut 444 from the ferrule 480 upon disassembly, as the axial component of reaction force can assist in separation of the nut 444 from the ferrule 480. Once the ferrule 480 is initially broken free from the tapered wall surfaces 447, the nut 444 can be separated without any substantial force, because of the taper angle of the tapered longitudinal surface 447.

Figure 11:
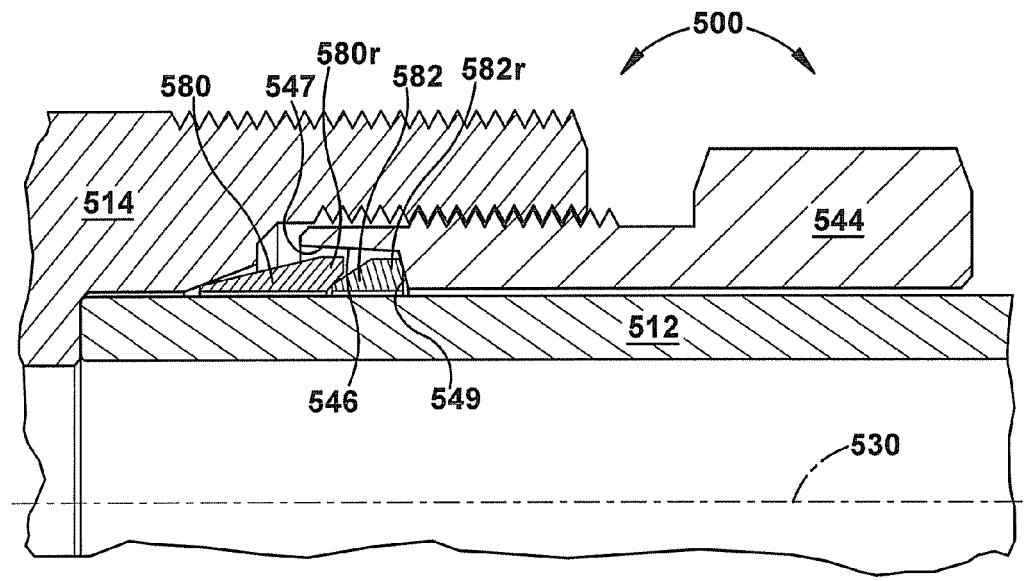
FIG. 11 is a partial sectional view of a tube fitting with a female threaded body and a male threaded drive nut with a tapered inner wall surface, shown in a finger tight condition before pull-up of the fitting.
Figure 12:
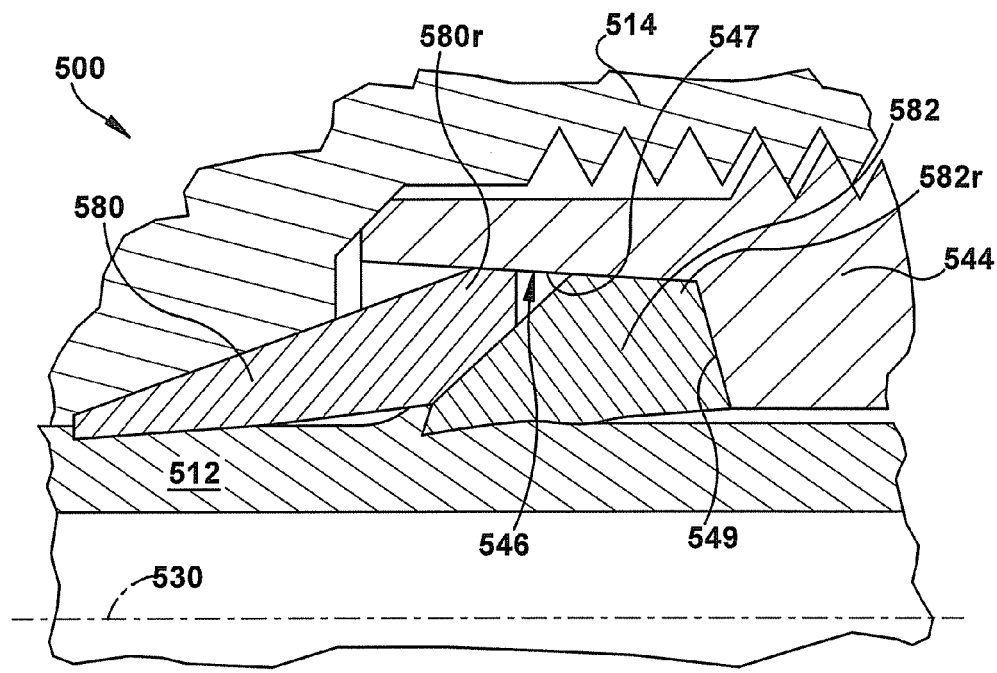
FIG. 12 is an enlarged partial sectional view of the tube fitting of FIG. 11 in a pulled-up condition.

FIGS. 11 and 12 illustrate a fitting 500 that is yet another exemplary embodiment in which a tapered longitudinal surface 548 is provided on an inner wall of a drive nut 544. The exemplary fitting of FIGS. 11 and 12 is a two-ferrule fitting of the type utilizing a male threaded drive nut 544 and a female threaded fitting body 514, similar to a tube fitting with male threaded drive nut described in Pub. No. US 2005/0242582 and entitled Fitting for Tube and Pipe, the entire disclosure of which is fully incorporated herein by reference.

During pull-up of the illustrated tube fitting, axially and radially inward movement of a nose of the front ferrule 580 may cause an outer portion 580r of the front ferrule 580 to expand or deflect outward. Likewise, axially and radially inward movement of the inner, gripping portion of the rear ferrule 582 may case an outer portion 582r of the rear ferrule to expand or deflect outward. Under some circumstances, one or both of these outer portions 580r, 582r of the ferrules 580, 582 may contact an inner wall 546 of the drive nut 544 during pull-up, causing a radial reaction load between the outer portion 580r, 582r of the ferrule or ferrules 580, 582 and the inner wall 546 of the drive nut 544. In the exemplary embodiment of FIGS. 11 and 12, a tapered longitudinal surface 547 is provided on the inner wall 546 at a location axially aligned with and radially spaced from the ferrules 580, 582. When the outer portions 580r, 582r of the ferrules 580, 582 deflect during pull-up, as shown in FIG. 12, one or both of the outer portions 580r, 582r may contact the tapered longitudinal surface 547, resulting in both a radial and an axial component of reaction force between the contacting surfaces. The tapered condition of the inner wall surface 347 (as opposed to, for example, a cylindrical surface) can assist in separation of the nut 544 from the ferrules 580, 582 upon disassembly, as the axial component of reaction force can assist in separation of the nut 544 from the ferrule or ferrules 580, 582. Once the ferrule or ferrules 580, 582 are initially broken free from the tapered wall surfaces 547, the nut 544 can be separated without any substantial force, because of the taper angle of the tapered longitudinal surface.

According to still another inventive aspect, assistance in separating first and second fitting components may be accomplished by reducing radially outward deflection of the second fitting component during axial compression of the second fitting component, to reduce radial reaction forces between the first and second fitting components. For example, a counter-bowing feature may be provided on a fitting body to reduce outward deflection or bowing of a tube end during fitting assembly. In one embodiment having a counter-bowing feature, a fitting component with a socket for receiving a tube end may be provided with an axially receding shoulder surface, or a shoulder having a surface that extends axially and radially inward from an axially inner end of an axial longitudinal wall surface of the socket.

Figure 13:
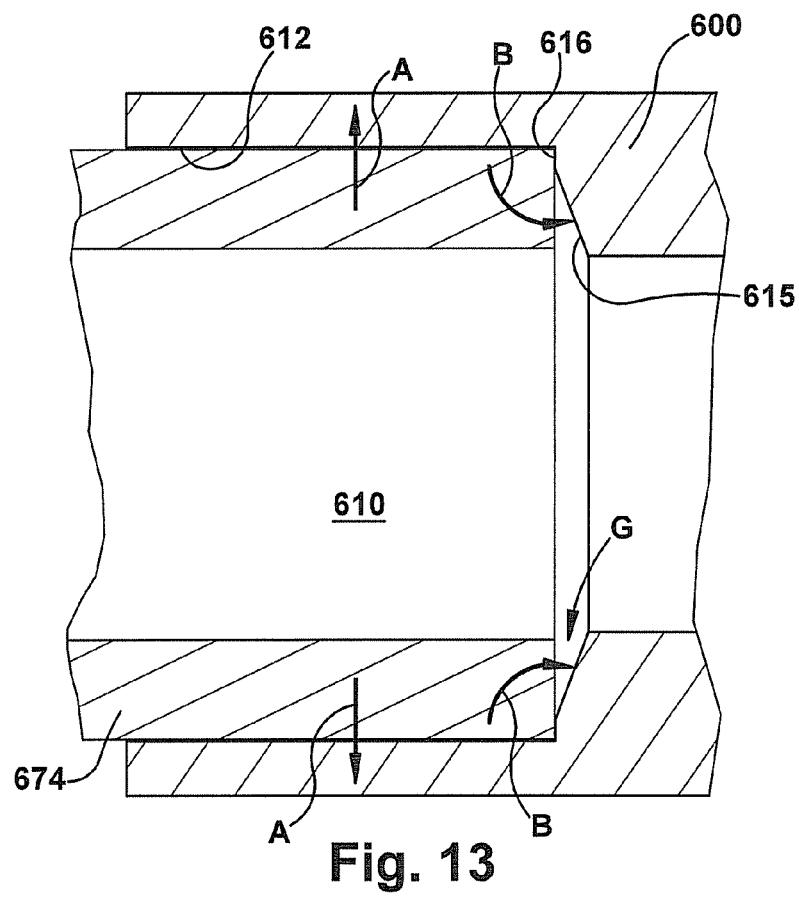
FIG. 13 is a partial sectional schematic view of a fitting component having a tube socket with an axially tapered shoulder surface, with a tube end installed in the tube socket in an axially compressed condition.

FIG. 13 illustrates a fitting component 600 having a socket 610 with an annular longitudinal wall surface 612 and an axially receding shoulder surface 615 that extends axially and radially inward of an axially inner end of the longitudinal wall surface 612. When a tube end 674 is axially compressed in the tube socket 610 against an outer portion 616 of the shoulder surface 615, an outward bowing force illustrated by arrows A tends to cause the tube end 674 to bow or barrel outward into engagement with the longitudinal wall surface 612. By axially receding the shoulder surface 615 inward from the outer portion 616 that engages the tube end 674, a gap G between an inner portion 676 of the tube end 674 and the shoulder 615 allows an inward pivoting force illustrated by arrows B to at least partially counteract the bowing force A, thereby reducing radial expansion of the tube end 674 due to bowing or barreling. This reduced radial expansion of the tube end 674 may facilitate separation of the tube end 674 from the fitting component 600 during disassembly.

Many different types of axially receding shoulder surfaces may be provided in a fitting component, including, for example, frustoconical, concave, convex, or stepped surfaces, or combinations of different contours or geometries, extending from (either directly or radially spaced from) the annular longitudinal wall surface. In the illustrated embodiment, the axially receding shoulder surface 615 includes a frustoconical surface extending from a substantially flat outer portion 616 of the shoulder surface 615, which extends to the longitudinal wall surface 612. This flat outer portion may, for example, provide a tube end engaging surface against which the tube end 674 bottoms out before or during axial compression of the tube end.

This counter-bowing feature may be provided with many different types of fitting components, including any fitting component having a socket for receiving another fitting component, such as a tube end, that experiences axial compression while inserted in the socket, including, for example, a fitting installation tool that pre-assembles or swages a tube gripping member, such as a ferrule or ferrules, to a tube end prior to fitting assembly. One example of such a fitting installation tool to which these inventive aspects may be applied is a manually operated hydraulic swaging unit described in U.S. Pat. No. 6,463,778 (the "'778 patent"), entitled "Apparatus for Swaging Ferrules," the entire disclosure of which is incorporated herein by reference.

Figure 14:
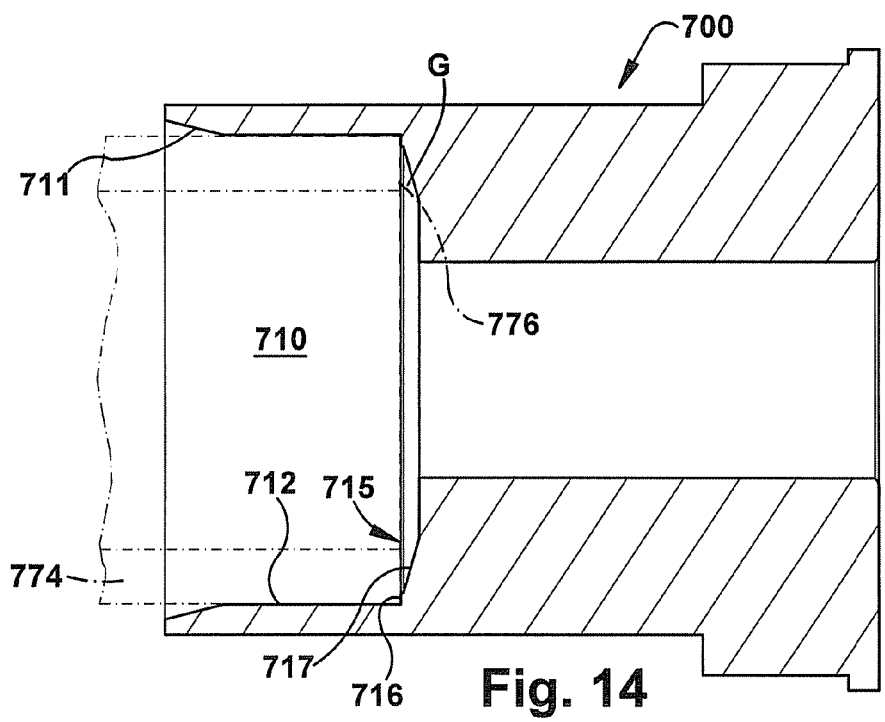
FIG. 14 is a partial sectional view of a fitting installation tool for tightening a tube gripping member to a tube end, the tool including a tube socket with an axially tapered shoulder surface.

FIG. 14 illustrates an exemplary tightening or swaging die 700 for use with a swaging tool, such as, for example, the exemplary hydraulic swaging unit of the '778 patent. The swaging die 700 includes a socket 710 having an axially outer camming surface 711, an annular longitudinal wall surface 712, and an axially receding shoulder surface 715, that extends axially and radially inward from an inner end of the longitudinal wall surface 712. When a tube end 774 is axially compressed in the socket 710, for example, due to axial advancement of the die 700, a gap G between the axially receding shoulder surface 715 and an inner portion 776 of the tube end 774 allows an inward pivoting force on the axially compressed tube end 774 to at least partially counteract a bowing force, thereby reducing radial expansion of the tube end 774 due to bowing or barreling.

The gap G between the shoulder surface 715 and the inner portion 776 of the tube end 774 may be sized to limit inward pivoting of the tube end 774 during axial compression, and/or to provide additional axial support for the axially compressed tube end 774, by allowing at least part of the inner portion 776 of the tube end 774 to engage the shoulder surface upon axial compression of the tube end 774. For example, in one embodiment, the shoulder surface 715 includes a tapered portion 717 that extend from an outer portion 716 at an angle of approximately 75° with respect to an axial center line of the die 700.

Additionally, the surfaces of the socket 710 may, but need not, be further configured to facilitate separation of the tube end from the tool or swaging die 700 using one or more of the other features described herein, such as, for example, a stepped or tapered annular longitudinal surface to reduce radial reaction forces and/or increase axial reaction forces between the tube end 774 and the die 700. For example, in the illustrated swaging die 700, the annular longitudinal wall surface 712 may be provided with an intermediate tapered portion 713, to reduce radial reactions force and/or increase axial reaction forces between the tube end 774 and the die 700. The angle of the tapered portion 713 may, but need not, be relatively slight or over a relatively short axial distance; for example, in one embodiment, for tubing having an outer diameter of approximately 1.1 inches (28 mm), an intermediate portion 713 is tapered at angle of approximately 0.67° over an axial length of approximately 0.088 inches (2.2 mm).

Figure 15:
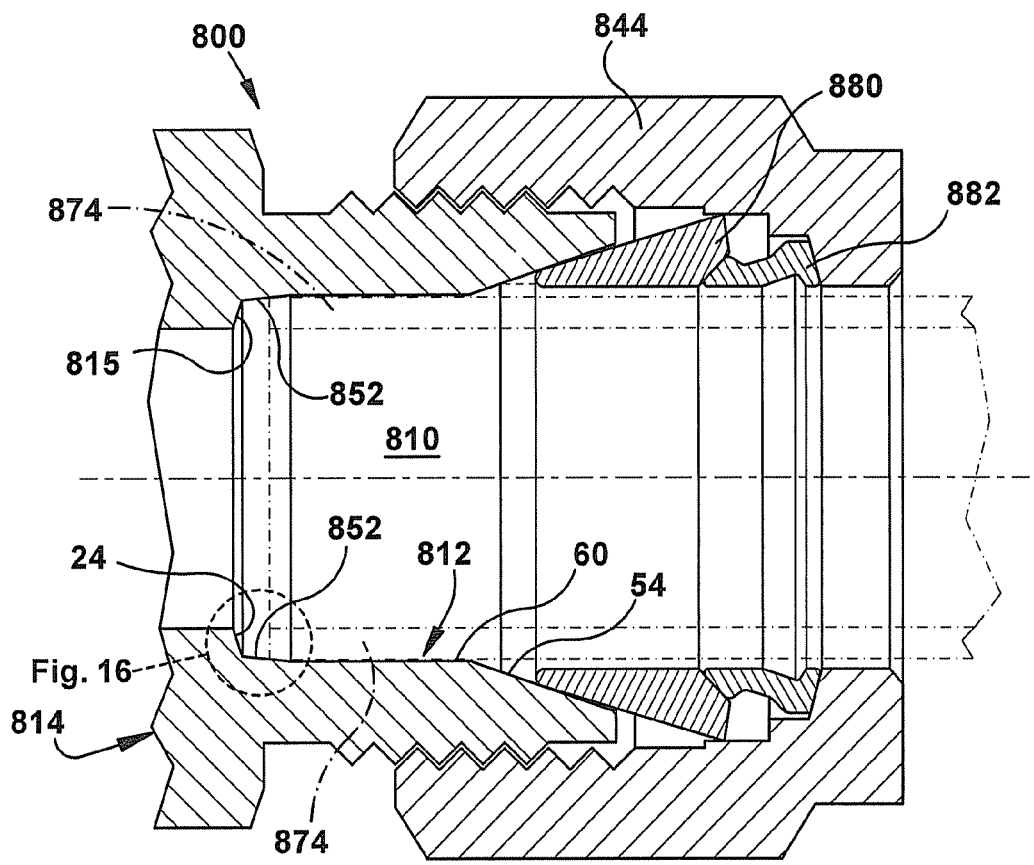
FIG. 15 is a partial sectional view of a tube fitting having a tube socket with an axially tapered shoulder surface, shown in a finger tight condition before pull-up of the fitting.
Figure 16:
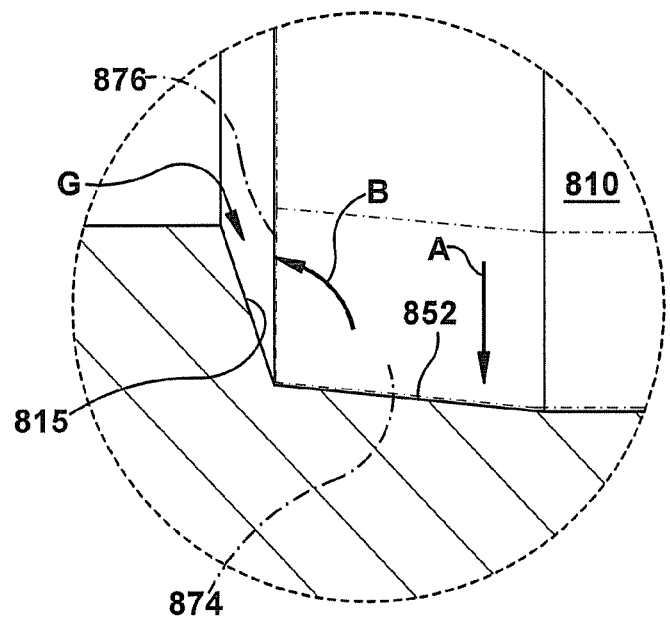
FIG. 16 is an enlarged partial sectional view of the tube fitting of FIG. 15 in a pulled-up condition.

A counter-bowing feature may also be provided in a fitting body to reduce radial reaction forces between a tube end and the fitting body, thereby assisting in separation of the tube end from the fitting body during fitting disassembly. FIGS. 15 and 16 illustrate an exemplary fitting assembly 800 including a counter-bowing feature. The fitting assembly 800 includes a fitting body 814 having a socket 810 for receiving a tube end 874. The socket includes an annular longitudinal wall surface 812 and an axially receding shoulder surface 815 that extends axially and radially inward from an axially inner end of the longitudinal wall surface 812. The fitting 800 may further include a drive nut 844 and ferrules 880, 882, which may, but need not, be consistent with the nut 44 and ferrules 80, 82 of the fitting 10 of FIG. 1.

The fitting body 814 may be configured to receive the tube end 874 such that the tube end 874 engages or bottoms out against an outer portion of the shoulder 815 in the fitting's finger-tight condition, or prior to axial compression of the tube end 874. In another embodiment, the tube end 874 may engage a tapered tube capture surface 852 in the fitting's finger tight condition, resulting in a space between the shoulder surface 815 and the end of the tube 874, as illustrated in FIG. 15. When the fitting 800 is pulled up, as illustrated in FIG. 16, the tube end 874 is axially compressed into engagement with the shoulder surface 815, at which point a gap G between the axially receding shoulder surface 815 and an inner portion 876 of the tube end 874 allows further axial compression of the tube end 874 to produce inward pivoting forces B, which at least partially counteract outward bowing forces A to reduce the radial reaction forces between the fitting body 814 and the tube end 874, thereby assisting in separation of the tube end 874 from the fitting body 814 during fitting disassembly. As with the fitting installation tool die 700 of FIG. 14, the gap G may be limited such that axial compression of the tube end 874 results in additional axial support of the inner portion 876 of the tube end 874.

As with the tool die 700 described above, a socket 810 of a fitting body 814 may, but need not, be further configured to facilitate separation of the tube end 874 from the fitting body 814 using one or more of the other features described herein, such as, for example, a stepped, tapered, or recessed annular longitudinal surface to reduce radial reaction forces and/or increase axial reaction forces between the tube end 874 and the fitting body 814, as shown, for example, in the exemplary embodiments of FIGS. 1-6.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A fitting assembly having a longitudinal axis, comprising:
    a fitting body that receives a conduit,
    a threaded drive nut comprising a drive surface and a first tapered longitudinal surface and a second tapered longitudinal surface; said first tapered longitudinal surface and said second tapered longitudinal surface being radially and axially outward of said radial drive surface,
    a first conduit gripping member and a second conduit gripping member, said first conduit gripping member will engage a camming surface of said fitting body during fitting pull-up, and said second conduit gripping member will engage said drive surface during fitting pull-up; said first conduit gripping member being radially spaced from said first tapered longitudinal surface when the fitting assembly is in a finger tight condition,
    wherein said first conduit gripping member is radially displaced into contact with said first tapered longitudinal surface during fitting pull-up of the fitting assembly onto the conduit, said first tapered longitudinal surface and said second tapered longitudinal surface assist in separating said drive nut from said first conduit gripping member and said second conduit gripping member during fitting disassembly,
    wherein said first tapered longitudinal surface and said second tapered longitudinal surface are discontinuous with respect to each other.

2. The fitting assembly of claim 1 wherein said first tapered longitudinal surface and said second tapered longitudinal surface are each tapered at an angle that is greater than 0° up to approximately 45° relative to the longitudinal axis.

3. The fitting assembly of claim 2 wherein said first and second tapered longitudinal surfaces are tapered at an angle that is between about 5° and about 30° relative to the longitudinal axis.

4. The fitting assembly of claim 2 wherein said first tapered longitudinal surface and said second tapered longitudinal surface are each tapered at an angle that is between about 10° and about 20° relative to the longitudinal axis.

5. The fitting assembly of claim 1 wherein said second conduit gripping member is radially displaced into contact with said second tapered longitudinal surface during fitting pull-up to produce an axial component of an elastic reaction force against said second conduit gripping member.

6. The fitting assembly of claim 1 wherein said first conduit gripping member is spaced from said first tapered longitudinal surface by a gap g1 and said second conduit gripping member is spaced from said second tapered longitudinal surface by a gap g2 when the fitting assembly is in a finger tight position.

7. A fitting having a longitudinal axis comprising:
    a drive nut that receives a front ferrule and a rear ferrule and mates with a fitting body:

said drive nut comprising an inner wall that provides a recess adapted to receive said front ferrule and said rear ferrule, said inner wall comprising a drive surface that will drive said rear ferrule against said front ferrule during pull-up of the fitting;

said inner wall comprising a first tapered longitudinal surface that extends at an angle that is greater than 0° up to approximately 45° with respect to the longitudinal axis and a second tapered longitudinal surface that extends at an angle that is greater than 0° up to approximately 45° with respect to the longitudinal axis, said first tapered longitudinal surface extending between said drive surface and said second longitudinal surface, said first tapered longitudinal surface and said second tapered longitudinal surface each being radially and axially outward of said drive surface, said first tapered longitudinal surface and said second tapered longitudinal surface being discontinuous with respect to each other, said first tapered longitudinal surface being axially aligned with said rear ferrule and said second tapered longitudinal surface being axially aligned with said front ferrule when the fitting is in an assembled condition, wherein when the fitting is pulled up onto a conduit, said rear ferrule is radially displaced into contact with said first tapered longitudinal surface, and said front ferrule is radially displaced into contact with said second tapered longitudinal surface, and said first tapered longitudinal surface and said second tapered longitudinal surface assist in separating said drive nut from said front ferrule and said rear ferrule during fitting disassembly.

8. The fitting of claim 7 wherein said first tapered longitudinal surface forms a first portion of said recess that receives said rear ferrule and said second tapered longitudinal surface forms a second portion of said recess that receives said front ferrule.

9. The fitting of claim 7 wherein said first tapered longitudinal surface and said second tapered longitudinal surface each taper at a respective angle that is the same as the other.

10. The fitting of claim 7 wherein said first tapered longitudinal surface and said second tapered longitudinal surface each taper at a respective angle that is different from the other.

11. The fitting of claim 7, wherein said drive nut comprises a female threaded nut.

12. The fitting of claim 7 wherein said fitting body threadably mates with said drive nut.

13. The fitting of claim 12 wherein said front ferrule engages a ferrule camming surface of said fitting body during fitting pull-up, and said rear ferrule engages said drive surface during fitting pull-up.

14. The fitting of claim 13 wherein a radially outermost portion of said front ferrule is radially spaced by a gap g1 from said second tapered longitudinal surface when the fitting is assembled prior to pull-up.

15. The fitting of claim 13 wherein a radially outermost portion of said rear ferrule is radially spaced by a gap g2 from said first tapered longitudinal surface when the fitting is assembled prior to pull-up.

* * * * *